United States Patent [19]

Vaughan

[11] Patent Number: 5,015,454

[45] Date of Patent: * May 14, 1991

[54] PROCESS FOR PREPARATION OF AN ECR-5 CRYSTALLINE ZEOLITE COMPOSITION

[75] Inventor: David E. W. Vaughan, Flemington, N.J.

[73] Assignee: Exxon Research & Engineering Company, Florham Park, N.J.

[*] Notice: The portion of the term of this patent subsequent to Jan. 5, 2005 has been disclaimed.

[21] Appl. No.: 517,995

[22] Filed: May 2, 1990

Related U.S. Application Data

[63] Continuation of Ser. No. 249,535, Sep. 26, 1988, abandoned.

[51] Int. Cl.$^5$ .............................................. C01B 33/34
[52] U.S. Cl. ...................................... 423/328; 502/64
[58] Field of Search ....................... 423/328, 329, 330; 502/60, 77

[56] References Cited

U.S. PATENT DOCUMENTS

4,717,560 1/1988 Vaughan ............................... 423/328

OTHER PUBLICATIONS

Barrer et al., "Chemistry of Soil Minerals Part VI, Salt Entrainment by Sodalite and Cancrinite during their Synthesis", J. Chem. Soc. (A), pp. 1516–1523 (1970).
Barrer et al., "Trapping of Inert Gases in Sodalite and Cancrinite Crystals", J. Phys. Chem. Solids, vol. 32 (1971), pp. 731–743.
Barrer et al., "Hydrothermal Chemistry of Silicates, Part 21, Zeolites from Reaction of Lithium and Caesium Ions with Tetramethylammonium Aluminosilicate Solutions", J. C. S. Dalton (1977), pp. 1020–1026.

*Primary Examiner*—W. J. Shine
*Assistant Examiner*—R. Bruce Breneman
*Attorney, Agent, or Firm*—Ronald D. Hantman

[57] ABSTRACT

ECR-5, a twelve-ring zeolite isostructural with cancrinite, has been synthesized in an ammonia free system for the first time. A range of Li-Na alumino silicate compositions yields porous materials useful as catalysts and sorbents.

4 Claims, No Drawings

PROCESS FOR PREPARATION OF AN ECR-5 CRYSTALLINE ZEOLITE COMPOSITION

This is a continuation of application Ser. No. 249,535, filed Sept. 26, 1988, now abandoned.

FIELD OF THE INVENTION

This invention relates to a novel zeolite and to a process for its preparation. In particular, the zeolite, known for convenience as ECR-5, apparently having a cancrinite-like structure, previously prepared using a synthesis solution containing aqueous ammonia, can now be made in the absence of ammonia by using mixed Li-Na and Li-Na-TMA synthesis mixtures.

BACKGROUND OF THE INVENTION

Cancrinite is a well-known natural zeolite having a $SiO_2:Al_2O_3$ ratio of two which is readily synthesized in systems consisting of $Na_2O$-$SiO_2$-$Al_2O_3$-$H_2O$ in the presence of a large variety of salts. See, for example, Barrer et al., J. Chem. Soc. A, 1523 (1970). In addition, U.S. Pat. No. 3,433,736 discloses hydroxyparacancrinite of the formula $3(Al_2O_3, 2SiO_2, Na_2O) 2NaOH$ from a mixture of silica, aluminum hydroxide and water. The main characterizing feature of cancrinite is a single 12-ring channel parallel to the 'c' axis as described by Jarchow, Zeit Krist., 122, 407 (1965) and Pahor et al., Acta Cryst., B38, 893 (1982). Because this channel is invariably faulted or blocked by salt molecules, the structure tends to have very poor sorption properties, even when attempts are made to remove the excess salt molecules (see Barrer and Vaughan, J. Phys. Chem. Solids, 32, 731 (1971)). The synthesis chemistry has been reviewed at great length by Barrer, Hydrothermal Chemistry of Zeolites, Academic Press (1982), Ch. 7.

If the channel of the cancrinite could be unblocked, the cancrinite would be expected to be a highly active catalyst (as are other zeolites having 12-ring channel systems) such as mordenite and offretite for cracking, hydrocracking and hydrodewaxing, and mordenite and zeolite L for hydroisomerization and reforming.

Although the synthetic analog of the zeolite cancrinite is easy to produce and is otherwise well-characterized, it always has an Si/Al ratio at unity, whether in its natural state or synthesized in a wide variety of systems, and such materials have very poor sorption properties and no catalytic activity.

In the present invention, Li-Na and Li-Na-TMA forms of ECR-5 (U.S. Pat. No. 4,717,560) have been made in non-ammonia systems for the first time. ECR-5 is a high silica, porous form of the mineral cancrinite, natural and synthetic forms of which have only previously been made at an Si/Al ratio of unity, and which have no sorption capacity for organic molecules. The main interest of this structure is that it has a structure analogous to those for L, offretite, mordenite and mazzite, which have considerably value as catalysts in reforming, hydrodewaxing and hydroisomerization. This is a new and easier synthesis than that previously used for ECR-5 in that no ammonia is used in the synthesis, and therefore a major pollutant is removed from the process effluent. The product ECR-5 materials have good hydrocarbon sorption properties, ECR-5 is unusual as a 12-ring structure, in that the puckering of the 12-ring causes a narrowing of the channel to make it closer to the diameter of 10-ring structures, such as ZSM-5, ZSM-11, ferrierite, ZSM-23, etc. Such materials are known to have good catalytic properties by virtue of their high degree of shape selectivity for specific substituted aromatics (e.g., para-xylene) and branched paraffins. Therefore the structure of ECR-5 may make it a more selective catalyst than other analogous channel structures, such as mordenite or offretite.

SUMMARY OF THE PRESENT INVENTION

According to the present invention, a zeolite with a cancrinite-like structure is synthesized over a range of $SiO:Al_2O_3$ ratios in forms where the twelve ring channel is substantially unblocked and unfaulted, such that the zeolite obtained is a superior sorbent. More particularly, the present invention relates to a method of preparing Li-Na or Li-Na-TMA form of the crystalline zeolite, ECR-5, having a composition, in terms of mole ratios of oxides, in the range:

$$1.0 \text{ to } 1.3 \text{ (R, Li, Na)}_2O \; Al_2O_3:2.0 \text{ to } 5.0 \; SiO_2$$

and having a cancrinite-like structure in which the twelvering channel thereof is substantially unblocked, and therefore sorbs hydrocarbons. The zeolite herein has an x-ray diffraction pattern which identifies it as having a cancrinite-like structure, the pattern being disclosed in Zeit. Krist., 122, 407 (1965), supra, the disclosure of which is incorporated herein by reference. This material may be considered as having a cancrinite-type structure but with higher Si/Al ratios characteristic of the zeolite ECR-5 (U.S. Pat. No. 4,717,560).

The zeolite of this invention is prepared by a process comprising:

(a) preparing a reaction mixture comprising aqueous solution, a source of silica, a source of alumina, said reaction mixture having a composition, in terms of mole ratios of oxides, within the following ranges:

$M_2O:Al_2O_3$:1.5 to 2.8
$SiO_2:Al_2O_3$:2 to 5
$H_2O:Al_2O_3$:50 to 140
wherein
$$M = (Li + Na \pm TMA)$$

$$\frac{Li}{Na} = 3 \text{ to } 9$$

$$\frac{TMA}{Li + Na} < 0.2$$

(b) maintaining the reaction mixture at a temperature and for a time sufficient to cause crystallization of the zeolite.

The ECR-5 zeolite may be used as a sorbent or as a catalyst, e.g., as a hydrocarbon conversion catalyst for, e.g., paraffin isomerization, aromatization, reforming, polymerization and alkylation or the cracking, hydrocracking and hydrodewaxing of lube stocks, fuels and crude oils.

It will be understood that the compositions herein as prepared may contain some waters of hydration which may be at least partially removed when the zeolites are employed as sorbents or catalysts. In addition, the sodium and other cations in the original synthesized zeolite may be subsequently exchanged with hydrogen, ammonium cations, metal cations from Groups I through VIII of the Periodic Table, or mixtures thereof, to provide a suitable catalyst material.

DESCRIPTION OF THE PREFERRED EMBODIMENTS

The forms of the ECR-5 zeolites of this invention have a cancrinite-like framework as determined by x-ray diffraction analysis and comparison with the x-ray diffraction pattern characteristic of cancrinites. See, Zeit. Krist. supra., U.S. Pat. No. 4,717,560, and Table 1.

In a preferred method for preparing the ECR-5 zeolite forms of the present invention, a reaction mixture is prepared, generally as a slurry. The materials can be made in a limited composition field in the mixed cation system Li$^+$+Na$^+$), (Li$^+$+Na$^+$+TMA$^+$) (TMA=tetramethyl ammonium), using aqueous rather than ammonia or ammonia-containing solvents. The elimination ammonia from the synthesis disposes of a major pollution problem, which is costly to recover from effluent waste streams associated with the processing.

In general terms the synthesis composition range for Li-ECR-5 can be stated as follows:

$$xM_2O:Al_2O_3:ySiO_2:zH_2O$$

where
x=1.5 to 2.8
y=2 to 4
z=50 to 140
M=(Li+Na±TMA) ± means with or without TMA
Li/Na=3 to 9
and TMA/(Li+Na)<0.2:

In the presence of excess Li, Li-ABW is dominant; when K is present, ECR-5 is suppressed; and at high Na levels FAU or MAZ predominate (the latter crystallizes only in the presence of TMA). Temperatures may vary from 80° C. to 200° C. and crystallization times from a few hours to several days.

In the TMA forms of ECR-5 the product is first calcined to remove the organic template (300° C.–500° C. in an air or oxygen atmosphere is sufficient to remove the organic cation), then the template face may be cation exchanged to convert it into the desired cation form using standard ion exchange methods, as described, for instance, in U.S. Pat. No. 3,216,789, and soluble salts fo Groups I through VIII of the Periodic Table of the elements. Such specific cation forms may be used as sorbents or catalysts.

EXAMPLES

The following examples demonstrate the efficiency of the invention.

EXAMPLE 1

A lithium-sodium composition $$Li_2O:Na_2O:Al_2O_3:3SiO_2:80H_2O$$

was made using meta-kaolin as the sole alumina source. 38.9 gms NaOH and 55.4 gms LiOH were dissolved in 500 ml H$_2$O, and 126.6 gms sodium silicate (P.Q. N brand) were blended in, followed by 152.9 gms metakaolin. The homogenized sample was divided between three 500 ml teflon jars and reacted in a forced air oven at 100° C. The products were sampled at 3, 4 and 5 days. These identical pure products have the x-ray diffraction pattern shown in Table 1. Chemical analysis gave a composition 6.48% Na, 13.90% Al, 20.08% Si, 3.23% Li, representing a stoichiometry:

$$0.90Li_2O:0.55Na_2O:Al_2O_3:2.88SiO_2$$

The capacity of this material for n-hexane at 22° C. and 45 torr was 4.8 wt %. Samples of the product were ion exchanged with delute HCl at pH=6, and 9 and NH$_4$Cl at pH=8 (adjusted with dilute HCl), and gave n-hexane sorption value of 3.5 wt %.

These materials clearly have superior porosity to conventional cancrinite and are typical of ECR-5 materials previously reported.

EXAMPLE 2

This sample is made using only metakaolin as the source of silica and alumina from a composition comprising:

$$0.5Na_2O:1.5Li_2O:Al_2O_3:2SiO_2:80H_2O$$

18.6 gms LiOH and 6.2 gms NaOH were dissolved in 228 gms H$_2$O, to which were added 40 gms metakaolin (derived from Georgia Kaolin Co. U F Kaolin by heating at 600° C. for three hours) and 0.2 gms of a sample of NaA zeolite as seed component. After heating this slurry for three hours at 100° C. in an air oven, the sample was filtered, washed with distilled water and analyzed. The product gave an x-ray diffraction pattern identical to that shown in Table 1, corresponding to the CAN topology, a chemical analysis representing a crystal stoichiometry of:

$$0.19Na_2O:0.81Li_2O:Al_2O_3:2SiO_2$$

A n-hexane sorption capacity at room temperature and 45 torr gave 3.9 wt % sorption.

EXAMPLE 3

A slurry composition:

$$1.2Li_2O:0.8Na_2O:Al_2O_3:3SiO_2:60H_2O$$

was synthesized by dissolving 12 gms NaOH and 28.4 gms LiOH in 218 gms H$_2$O, adding 36.2 gms HS-40 colloidal silica (DuPont Co.) and 55.3 gms meta-kaolin. This composition was divided and reacted at 100° C. and 150° C. After two days the 100° C. reaction yielded pure ECR-5, having an Si/Al ratio measured by microprobe of 1.31. The reaction at 150° C. yielded only Li-ABW and analcite.

EXAMPLE 4

A similar reaction to example 3 was made, except that the Na content was higher, as shown by the stoichiometry:

$$1.2Li_2O: 0.8Na_2O:Al_2O_3:3SiO_2:60H_2O$$

In this case the products of reaction at 100° C. and 150° C. after two days were both good ECR-5 materials. Microprobe analysis of the product from the 150° C. experiment gave an Si/Al=1.30.

EXAMPLE 5

A slurry composition:

$$1.5Li_2O:0.5Na_2O:Al_2O_3:4SiO_2: 80H_2O$$

was made by 5.4 gms LiOH in 47.7 gms $H_2O$, then adding 17.2 gms sodium silicate (N Brand, PQ Corp.) and 9.95 gms metakaolin. After thoroughly homogenizing, the sample was reacted in a Teflon bottle at 100° C. for three days, after which time the product comprised good ECR-5 plus some chabazite impurity. After seven days reaction the product comprized ECR-5 plus minor zeolite P.

EXAMPLE 6

A slurry composition:

$1.0Li_2O:0.8Na_2O_2:0.2(TMA)_2O:Al_2O_3:3SiO_2:80-H_2O$ was made using general method of example 5 by mixing together 25.5 g metakaolin, 9.3 g of $LiOH(H_2O)$, 9.7 g of 25% aqueous of tetra methyl ammonium hydroxide (TMA), 16.7 g of colloidal silica (DuPont Company HF-40), 141 g of $H_2O$.

After three days' reaction at 130° C. the sample comprised ECR-5 with minor chabazite impurity as determined by x-ray diffraction.

TABLE 1

X-Ray Diffraction Pattern For Li—Na ECR-5 (Ex. 1)

| 2θ° | d,Å | Intensity |
|---|---|---|
| 8.22 | 10.75 | w |
| 14.10 | 6.24 | s |
| 16.25 | 5.45 | w |
| 19.38 | 4.58 | vs |
| 21.55 | 4.12 | m |
| 24.50 | 3.62 | vs |
| 25.20 | 3.53 | m |
| 27.95 | 3.19 | vs |
| 32.90 | 2.72 | s |
| 33.05 | 2.71 | s |
| 34.60 | 2.59 | m |
| 35.60 | 2.52 | w | w = weak; m = medium; s = strong; vs = very strong

I claim:

1. A process for preparing a crystalline zeolite having a composition, in terms of mole ratios of oxides, in the range:

1.0 to 1.3 (Li, Na)$_2$O $Al_2O_3$:2.0 to 5.0 $SiO_2$ and being isostructural with cancrinite, as shown by its characteristic x-ray diffraction pattern and having a sorption capacity greater than about 1% by weight hexane, comprising the steps of (a) preparing a reaction mixture in an aqueous solution including a source of silica-alumina, said reaction mixture having a composition; in terms of mole ratios of oxides, within the following ranges:

$xM_2O:Al_2O_3:ySiO_2:zH_2O$ where
$x = 1.5$ to $2.8$
$y = 2$ to $4$
$z = 50$ to $140$
$M = (Li + Na)$ $$\frac{Li}{Na} = 3 \text{ to } 9$$

(b) maintaining the reaction at a temperature between about 80° C. and 200° C. and times between 0.1 and 10 days.

2. The process of claim 1 wherein M further includes TMA, where $$\frac{TMA}{Li + Na} < 0.2,$$

so that said crystalline zeolite has the composition 1.0 to 1.3 (Li, Na, TMA)$_2$O $Al_2O_3$:2.0 to 5.0 $SiO_2$.

3. The product of claim 1 having an ion-exchanged form obtained by contacting said product with solutions of the metals selected from the group consisting of Li, K, Rb, Cs, Group 2A, Group 2B, Group 3A, Group 3B, and Group 8 of the Periodic Table.

4. The products, and ion exchanged products, of claim 2 which are sorbents and catalysts.

* * * * *